March 8, 1966 — M. T. REESE ETAL — 3,239,595
SEAL ARRANGEMENT FOR ELECTRICAL DEVICES
Filed Aug. 6, 1962
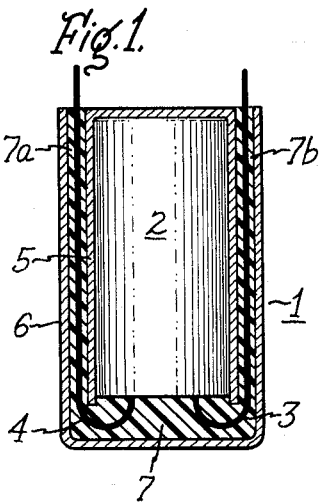
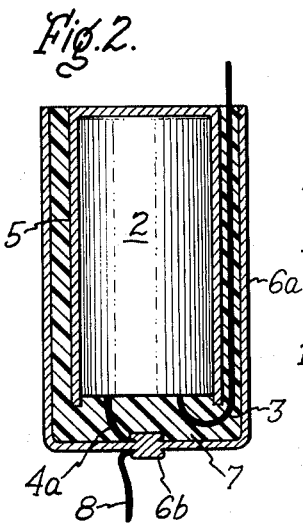
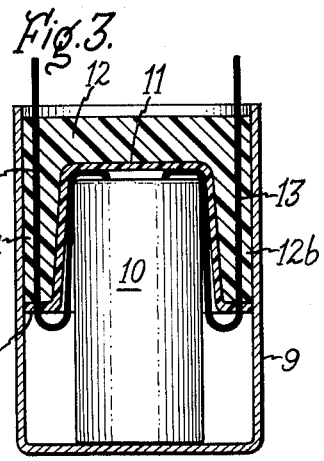
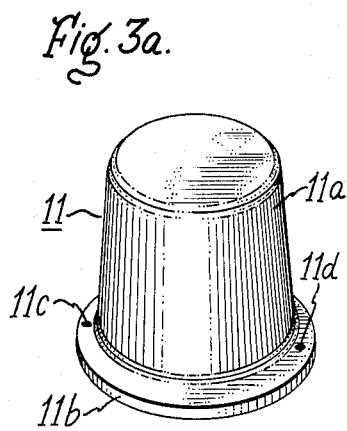
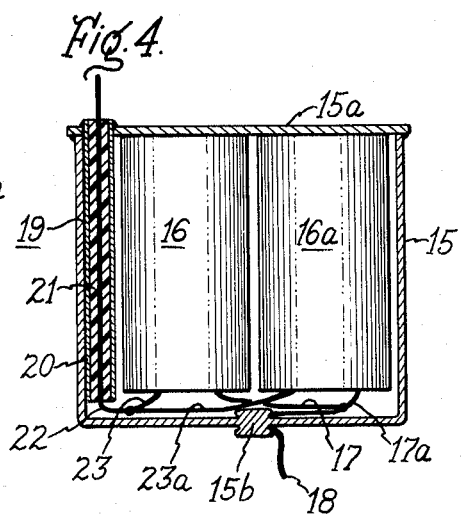
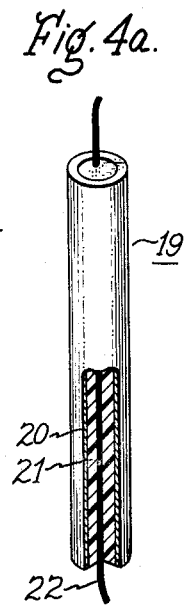
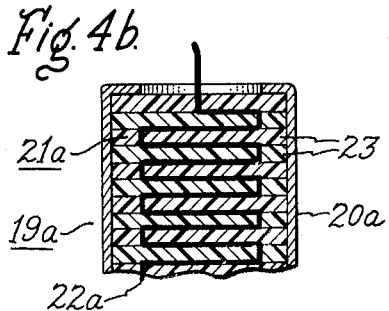
Inventors,
Morris T. Reese,
Ralph A. Ruscetta,
by Sidney Greenberg
Their Attorney.

United States Patent Office 3,239,595
Patented Mar. 8, 1966

3,239,595
SEAL ARRANGEMENT FOR ELECTRICAL DEVICES
Morris T. Reese and Ralph A. Ruscetta, Columbia, S.C., assignors to General Electric Company, a New York corporation
Filed Aug. 6, 1962, Ser. No. 215,159
2 Claims. (Cl. 174—52)

The present invention relates to seal arrangements for electrical devices, and more particularly to a fluid-tight seal for conductive leads in devices such as electrical capacitors.

A problem encountered in sealed liquid-containing electrical devices such as electrolytic capacitors is that of providing effective fluid-tight seals to prevent escape of the electrolyte or other liquid therefrom. Loss of even very small amounts of the electrolyte may lead to variation and degradation of the electrical properties of the unit, and may result in its premature breakdown. In electrical devices of this type, it is necessary for one or more electrical conductors or leads to pass through the outer casing. If the casing is made of insulating material, the sealing problem involved is to provide a fluid-tight seal between the lead member and the casing material through which it passes. If the casing is of metal, an insulating bushing must be employed and this involves the problem of providing an effective seal between the bushing and metal casing, as well as between the bushing and the lead passing therethrough.

It is an object of the invention to provide a novel means for sealing electrical devices which overcomes the above-mentioned problems.

It is a particular object of the invention to provide an effective fluid-tight seal for electrical leads in encased liquid-containing electrical devices, especially electrolytic capacitors.

It is another object of the invention to provide an economical and simplified fluid-tight seal of the above type.

Other objects and advantages will become apparent from the following description and the appended claims.

With the above objects in view, the present invention in its broad aspects relates to a sealed electrical arrangement comprising casing means, an electrical device within the casing means, sealing means comprising an elongated mass of material within the casing means extending along the electrical device, and conductive lead means extending from the electrical device and passing through the elongated mass of sealing means in fluid-tight sealing contact therewith to the exterior of the casing means.

The invention will be better understood from the following description taken in conjunction with the accompanying drawing, in which:

FIGURE 1 is an elevational view partly in section of one embodiment of a hermetically sealed electrical capacitor constructed in accordance with the invention;

FIGURE 2 is a view of an electrical capacitor similar to that of FIGURE 1 showing a different arrangement of terminal lead connections;

FIGURE 3 shows an electrical capacitor embodying a different sealing arrangement in accordance with the invention;

FIGURE 3a is a perspective view of a component of the FIGURE 3 construction;

FIGURE 4 shows still another embodiment of the invention in a multi-unit electrical capacitor;

FIGURE 4a is an enlarged elevational view, partly broken away, of the terminal seal component employed in the FIGURE 4 embodiment; and FIGURE 4b is a fragmentary sectional view of a modification of the seal component of FIGURE 4a.

A principal feature of the invention is to make use of the long dimension of an encased elongated electrical device to provide an elongated terminal lead seal which is many times more effective than the relatively shallow seals heretofore employed in such devices, while at the same time simplifying the construction and reducing the cost of the device without appreciably increasing the total volume of the device.

Referring now to the drawing, and particularly to FIGURE 1, there is shown an electrolytic capacitor 1 comprising a wound capacitor section 2 formed, as conventional in the art, of a pair of electrode foils separated by dielectric spacer material such as kraft paper, impregnated with a liquid electrolyte and having terminal leads 3, 4 extending from one end. Capacitor roll section 2 is contained in the inner one of a two-part casing comprising nested containers 5 and 6, each having an open end and arranged with their bottoms or closed ends at opposite extremities of the device and remote from one another. Capacitor roll section 2 is disposed with its leads adjacent the bottom end of container 6. In accordance with the invention, nested parts 5 and 6 are sufficiently different in diameter to provide a space between their side walls, and leads 3 and 4 are passed through this space back to the opposite end of the device to the exterior of casing 6. The hermetic seal is provided by introducing a suitable sealing material 7 into the space between the nested casing parts and embedding leads 3, 4 therein in fluid-tight sealing contact. There are thus provided elongated seals 7a, 7b for the leads extending substantially the entire length of the encased electrical device 2.

Since the effectiveness of a seal of this type increases at a much greater rate than the length of the seal, it becomes possible by the described means to obtain increases of effectiveness of the seal in an extremely large ratio.

The protection against leakage along the terminal leads in the device of FIGURE 1 can be still further greatly increased by spirally winding the leads about the inner casing part 5 in their passage from one end of the casing to the other.

Sealing material 7 may be composed of a wide variety of substances. In a typical case, asphalt or a synthetic resin, such as epoxy resin, may be employed. Other known or suitable sealing materials which may be used for this purpose include glass, waxes, cements, and elastomers.

In one embodiment of the invention, nested container parts 5, 6 may be made of metal, such as aluminum. In other embodiments, container parts 5, 6 may be made of electrically insulating material, such as cardboard or synthetic resin. If these parts are formed of a thermoplastic resin material, such as polyethylene resin, it is possible to achieve the object of the invention by assembling the container parts with the leads passing therebetween as shown in FIGURE 1, placing the assembly in a mold and effecting the seal between the mating parts by heating the assembly until the casing material flows and fuses together with the leads embedded therein. Such a procedure dispenses with the need for introducing any additional sealing material 7 such as shown in FIGURE 1.

In another embodiment, both nested parts 5, 6 may be composed of a thermosetting resin such as a phenolic compound, and an epoxy resin sealing material is introduced between the nested parts.

The use of nested casing parts as illustrated in FIGURE 1 also lends itself to an embodiment wherein one or both casing parts are electrically conductive and serve as part of the electrical connection to the leads. In such arrangements, the sealing material 7 introduced between the casing parts serves the dual function of a seal and insulator between electrically conductive portions of opposite polarity.

FIGURE 2 shows an embodiment of this type wherein one of the leads is electrically connected to one of the casing parts. In the device illustrated, metallic outer casing member 6a is provided with an integral rivet portion 6b to which lead 4a is secured on the inside and external lead 8 is attached on the outside of casing 6a. In this arrangement, sealing material 7 serves as a seal for lead 3 and also as an insulator between lead 3 and metal casing part 6a.

FIGURE 3 shows still another embodiment of the invention wherein the elongated insulating seal is obtained in a different manner. As shown in FIGURE 3, this arrangement comprises a cup-shaped open ended casing 9, which may be of metal or electrically insulating material, containing an elongated electrolytic capacitor roll 10 similar to capacitor roll 2 previously described. Arranged over the upper or outer end portion of capacitor roll 10 is barrier cap 11, shown in perspective in FIGURE 3a, which is hat-shaped and has a crown portion 11a and a rim or flange 11b. Preferably, barrier cap 11 tapers toward its closed end as shown and is otherwise dimensioned to fit snugly over the upper end of capacitor roll 2 with the edge of rim 11b engaging the inner surface of casing 9. Cap 11 thus defines with the upper portion of casing 9 a cavity for receiving insulating sealing material 12, the cavity having an elongated annular portion surrounding the upper portion of capacitor roll 10. Sealing material 12 is composed, for example, of asphalt or other electrically insulating material such as previously described in connection with sealing material 7. Leads 13 and 14 extend from the upper end of capacitor roll 10 downwardly between roll 10 and the inner surface of barrier cap 11, and then pass upwardly through apertures 11c and 11d formed in rim 11b and extend through the elongated seal paths 12a, 12b formed between the rim 11b and the upper surface of seal material 12 to the exterior of casing 9. As a result of this construction, barrier cap 11 serves a number of functions, namely, it considerably extends the effective length of the capacitor seal, it serves as a receptacle to hold the sealing material in place as the latter is introduced in fluid form and hardens, and it acts as a protective shield for the capacitor roll against the elevated temperature of the sealing compound when poured into place, thereby avoiding boiling or vaporizing of the electrolyte contained in the capacitor roll 10.

FIGURE 4 illustrates another embodiment of the invention wherein the elongated seal path is provided by an independent seal unit which may be employed in various combinations with encased capacitor sections. Shown in FIGURE 4 is a metal casing 15 enclosed by cover 15a and containing a plurality of elongated capacitor roll sections 16, 16a each having a pair of terminal leads extending from their bottom ends. Roll sections 16, 16a may be secured within casing 15 by means of a potting compound (not shown), such as asphalt or a suitable synthetic resin material, as well known in the art. The bottom wall of casing 15 is formed with an integral rivet portion 15b to which leads 17, 17a of one polarity are electrically connected on the inside of casing 15, and to which external lead 18 is secured on the outside of casing 15. Seal unit 19 as shown in FIGURES 4 and 4a is constituted by an elongated metal tube 20 filled with seal material 21 and having lead wire 22 passing therethrough and fluid-tightly embedded in sealing material 21. At its lower end, lead wire 22 is electrically connected to capacitor terminal leads 23, 23a. At the upper end of seal unit 19, tube 20 fits into an aperture in casing cover 15a and is suitably secured thereto in fluid-tight relation, such as by soldering or welding. Seal unit 19 may also be secured to the inside wall of casing 15 by welding or soldering tube 20 thereto along its length, if desired. Advantages of this embodiment are that tubular seal unit 19 may be made independently of the capacitor device in which it is ultimately to be disposed and it may be arranged in various desired positions in a capacitor casing to fit a variety of needs and conditions. The terminal seal thus provided can be produced in quantity beforehand and under conditions which insure uniformly effective fluid-tight terminal seals even though later applied to various types of electrical devices.

The seal unit 19 may also be made flexible which will permit the seal unit 19 to be wound in a flat spiral or other configuration which may lend itself to improved utilization of space for a particular arrangement within the device.

FIGURE 4b shows a modification of the seal unit 19 shown in FIGURE 4a, wherein the seal material 21a enclosed within outer tube 20a comprises stacked insulating discs 23 or equivalent laminar members through which lead wire 22a passes in a folded or zig-zag path, thus providing a long seal path in a relatively short length of seal unit. In making the FIGURE 4b unit, discs 23, which may for example be made of a thermoplastic material such as polyethylene or of glass cloth bearing a resinous adhesive, are provided with apertures near their edge through which lead wire 22a is threaded, and the discs 23 are then assembled in stacked arrangement in tube 20a with the apertures of adjacent discs remote from one another. The stacked assembly may then be subjected to sufficient heat and pressure to bond the discs together and embed the lead wire 22a in the composite mass in fluid-tight sealing contact.

Other embodiments of the invention may incorporate the stacked disc construction shown in FIGURE 4b. For example, in the FIGURE 3 device, the portion of the sealing material 12 lying above cap 11 may be constituted by a series of stacked discs having leads 13 and 14 passing therethrough in folded paths as shown in FIGURE 4b.

Although the invention has been described principally with respect to electrolytic capacitors, it will be evident that the described seal structure may have application to other electrical devices where maintenance of a strong, fluid-tight seal for the container or leads of the electrical device is of importance. It will also be evident that the invention has specific application to many types of electrical devices which depend for successful operation on either sealing in a liquid or gaseous material or in sealing out contaminants or foreign material which might enter.

Accordingly, while the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. A sealed electrical arrangement comprising, in combination, a casing having an open end, an elongated electrical device in said casing having an end adjacent said open end of said casing and having conductive lead means projecting therefrom, a cup-shaped covering member fitting over said end of said electrical device and having a rim at its open end engaging the inner wall of said casing so as to define therewith an elongated annular cavity between said covering member and said casing extending a substantial distance along said electrical device, and sealing material occupying said elongated cavity, said conductive lead means passing through said elongated space to the exterior of said casing and embedded in said sealing material.

2. A sealed electrical arrangement comprising, in combination, a casing having an open end, an elongated electrical device in said casing having an end adjacent said open end of said casing and having conductive lead means projecting therefrom, a cup-shaped covering member composed of electrically insulating material and tapering toward its closed end and fitting over said end of said electrical device and having a rim at its open end engaging the inner wall of said casing so as to define therewith an elongated annular cavity between said covering member and said casing extending a substantial distance along said electrical device, and sealing material occupying said elongated cavity, said conductive lead means passing through said elongated space to the exterior of said casing and embedded in said sealing material.

References Cited by the Examiner

UNITED STATES PATENTS

| | | | |
|---|---|---|---|
| 1,856,392 | 5/1932 | Kevelson | 174—52 |
| 2,049,919 | 8/1936 | McLain | 317—242 X |
| 2,089,264 | 8/1937 | Ingmanson | 174—76 X |
| 2,702,878 | 2/1955 | Heibel | 317—242 |
| 2,763,708 | 9/1956 | Brennan | 174—52 |
| 2,809,331 | 10/1957 | Canty et al. | 317—230 |
| 2,894,316 | 7/1959 | Genovese | 174—52 |
| 3,046,452 | 7/1962 | Gellert | 174—52 |
| 3,060,356 | 10/1962 | Beyer | 317—242 |

FOREIGN PATENTS

| | | |
|---|---|---|
| 566,428 | 12/1932 | Germany. |
| 482,053 | 3/1938 | Great Britain. |
| 402,646 | 3/1943 | Italy. |

JOHN F. BURNS, *Primary Examiner.*

JOHN P. WILDMAN, LARAMIE E. ASKIN, E. JAMES SAX, *Examiners.*